United States Patent
Belz et al.

(10) Patent No.: US 6,179,536 B1
(45) Date of Patent: Jan. 30, 2001

(54) EXPANSION DOWEL

(75) Inventors: Thomas Belz, Kaufering; Michael Werner, Munich, both of (DE)

(73) Assignee: Hilti Aktiengesellschaft, Schaan, Liechtenstein (LI)

( * ) Notice: Under 35 U.S.C. 154(b), the term of this patent shall be extended for 0 days.

(21) Appl. No.: 09/418,334

(22) Filed: Oct. 14, 1999

(30) Foreign Application Priority Data

Oct. 26, 1998 (DE) ............................................. 198 49 202

(51) Int. Cl.[7] ........................................................ F16B 13/06
(52) U.S. Cl. ............................ 411/54.1; 411/54; 411/60.1
(58) Field of Search ............................... 411/54, 54.1, 45, 411/60.1

(56) References Cited

U.S. PATENT DOCUMENTS

| 3,217,583 | 11/1965 | Fulop . | |
|---|---|---|---|
| 4,560,311 | * 12/1985 | Herb et al. | 411/54 X |
| 4,770,580 | * 9/1988 | Fischer | 411/54 X |
| 5,205,689 | * 4/1993 | Fischer | 411/54 |

FOREIGN PATENT DOCUMENTS

| 3117581 | * 11/1982 | (DE) | 411/54 |
|---|---|---|---|
| 3205928 | 9/1983 | (DE) . | |
| 3729330 | 9/1987 | (DE) . | |
| 0412257 | 2/1991 | (EP) . | |
| 0635646 | 1/1995 | (EP) . | |

* cited by examiner

*Primary Examiner*—Neill Wilson
(74) *Attorney, Agent, or Firm*—Brown & Wood, LLP

(57) ABSTRACT

An expansion dowel, including an expansion sleeve (2) having a rear section (3) provided with an inner thread (4), an opposite expansion section (5) with a plurality of expansion tabs (6) separated by axial slots, and a stepped bore (9,10) having in, the expansion section (5), a smaller inner diameter (s) than in the rear section (3) and a circumferential annular shoulder (11) formed in a transitional region between the rear and the expansion sections (3,5) and facing substantial toward a rear end of the expansion sleeve (2), and an expansion member (12) provided at a front end of the expansion sleeve (2) projecting beyond the front, the expansion member (12) projecting beyond the front end of the expansion sleeve (2), widening substantially conically in a setting direction (5), and having a length (l) larger than a length (k) of the expansion section (5) of the expansion sleeve (2).

8 Claims, 2 Drawing Sheets

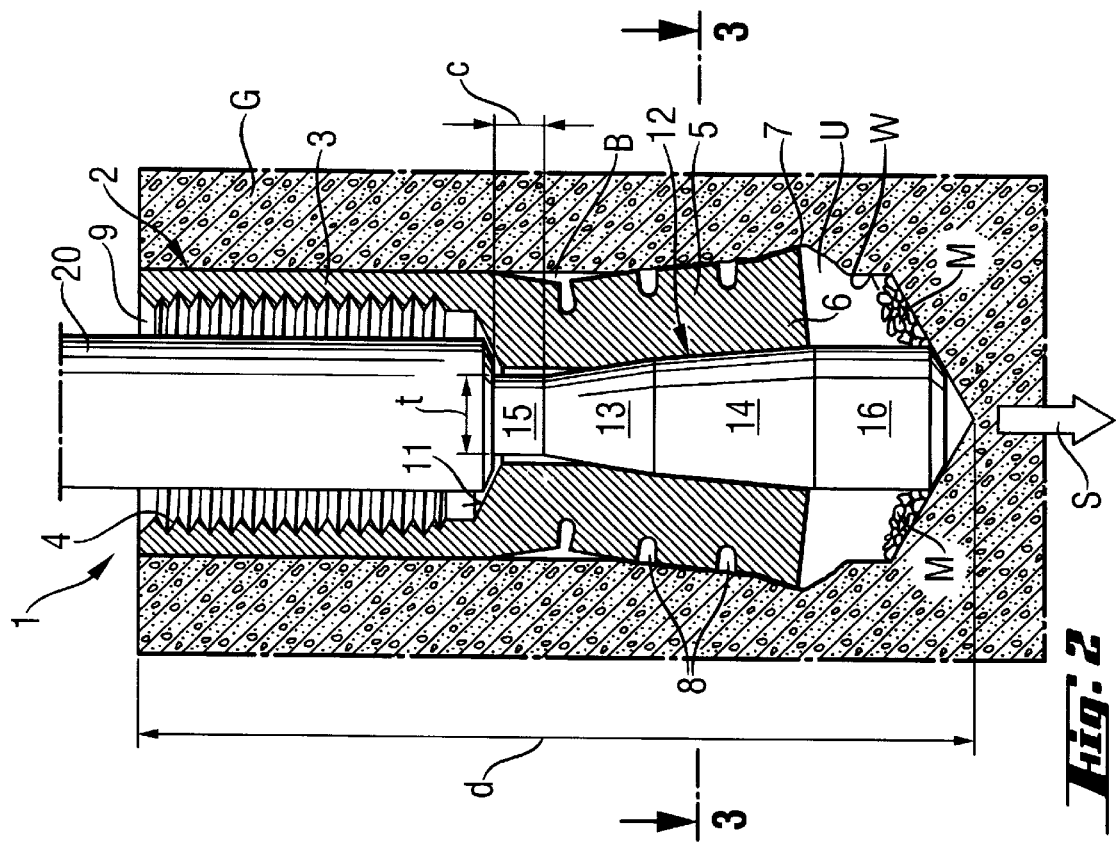
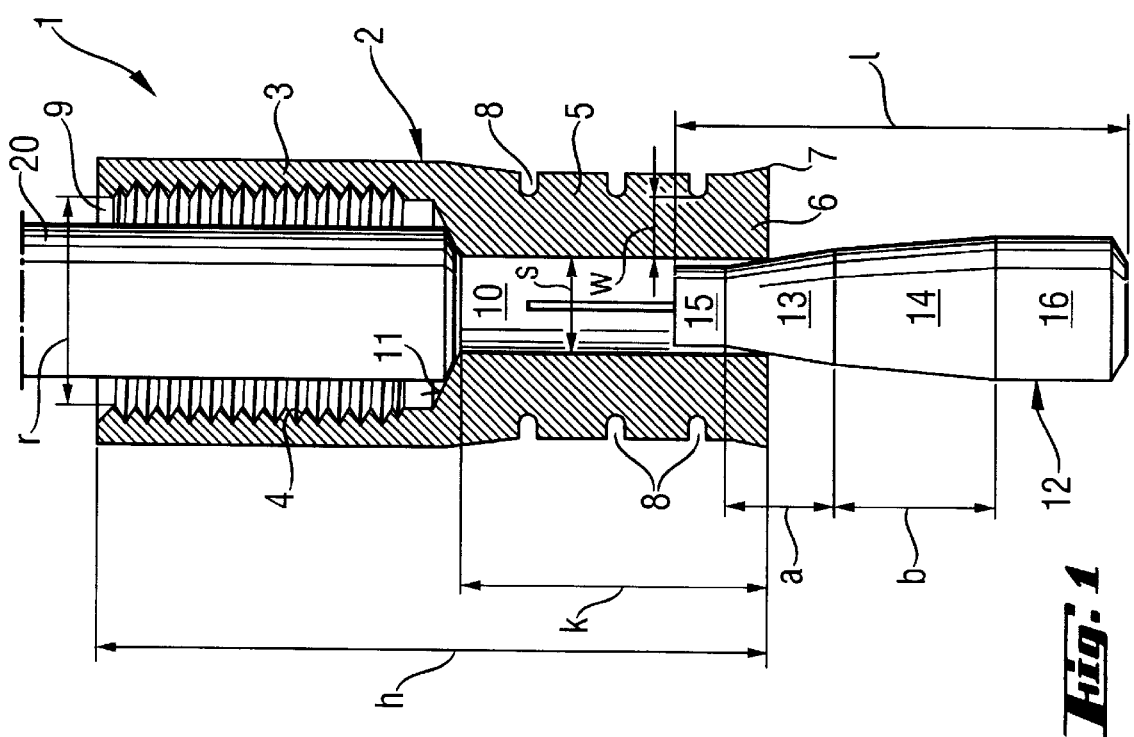

EXPANSION DOWEL

BACKGROUND OF THE INVENTION

1. Field of the Invention

The present invention relates to an expansion dowel, in particular, to an undercut self-cutting dowel including an expansion sleeve having a rear section provided with an inner thread, an opposite expansion section with a plurality of expansion tabs, and a through-bore, with the dowel further including an expansion member provided at a front end of the expansion sleeve and retained in the sleeve bore, with the expansion member projecting beyond the front end of the expansion sleeve, and the expansion tabs expanding radially outwardly upon the expansion sleeve being driven over the expansion member.

2. Description of the Prior Art

For fastening of constructional parts to a constructional component made, e.g., of concrete or stone, as a rule, expansion dowels are used. A conventional expansion dowel includes essentially an expansion sleeve having an expansion region and an expansion member. Upon the relative movement of the expansion sleeve and the expansion member, the expansion region of the expansion sleeve expands radially. As a result of the radial expansion of the expansion region of the expansion sleeve, the expansion dowel becomes force lockingly or form lockingly anchored in a bore formed in the constructional component. In cases, where small axes and edge distances must be maintained, primarily, formlockingly anchorable expansion dowels are used. The attachment of this type forms a so-called undercut system. To form an undercut fastening or attachment system, first, an undercut is formed in the vicinity of the bottom of the bore in which the expansion dowel is received. Then, an anchor rod with an expansion sleeve mounted thereon is inserted into the bore. The expansion tabs of the expansion sleeve expand radially upon relative movement between the expansion sleeve and a cone head formed at the front end of the anchor rod and widening in the setting direction. The expansion tabs, which engage in the undercut, form a formlocking connection of the dowel with the constructional component.

In accordance with one embodiment of an undercut attachment system, the expansion dowel is being anchored without first forming an undercut with a special tool. With this embodiment, a formlocking connection is formed automatically during the setting process of the dowel. The formation of the formlocking connection takes place as a result of rotation of the expansion sleeve during the setting process, with the sleeve being simultaneously driven onto the widening in the setting direction, cone head by axial blows imparted by a hammer mechanism. The expansion tabs of the rotatable expansion sleeve are provided at their free ends with cutters which mill an undercut in the bore wall during the setting process. At the end of the setting process, the radially expanded expansion tabs become formlockingly anchored in the undercut in the bore wall during the setting process. In addition to the undercut self-cutting expansion dowel which forms an undercut as a result of the rotation of the expansion sleeve, also known are undercut attachment systems with which formlocking connection is achieved without the rotation of the expansion sleeve. For the formation of an undercut, it is sufficient to displace the expansion sleeve over a conical expansion member by axial blows. During the displacement of the expansion sleeve, the cutters, which are provided at the free ends of the expansion tabs, form an undercut by chiseling the bore wall, with the chiseled wall material being simultaneously removed, and with the expansion tabs being formlockingly anchored in the undercut at the end of the setting process.

The undercut attachment systems includes primarily an anchor rod provided with a head portion widening in the setting direction and an expansion sleeve displaceable along the anchor rod. However, it is also desirable to have formlockingly fastening systems with no connection parts projecting above the upper surface of a constructional component in which an expansion dowel is anchored. With these systems, it becomes possible, e.g., to provide an attachment point at which a constructional part can be attached at a later time. Such undercut attachment systems includes an expansion sleeve with an inner thread and having a through-bore and a plurality of expansion tabs which are provided in the expansion region of the sleeve and are separated by axial slots. At a front end of the expansion sleeve, there is provided an expansion member which has a smaller diameter section projecting into the sleeve bore, whereby the expansion member is held by the expansion sleeve. For formlocking anchoring of a such undercut self-cutting expansion dowel, the expansion sleeve is driven by axial blows over the expansion member which is supported against the bottom of a bore formed in a constructional component. The cutters, which are provided at free ends of the expansion tabs of the expansion sleeve, chisel the bore wall, forming an undercut. For axially driving the expansion sleeve over the expansion member, usually, axial blows are applied directly to the rear end of the expansion sleeve of the dowel, which is inserted in the constructional component bore, with a hammer. As a result of application of axial blows directly to the rear end of the sleeve, the inner thread at the entrance can be damaged. Further, with the expansion dowels having external conical expansion members, there is no possibility to control during the setting process or thereafter whether the expansion tabs of the expansion sleeve expanded at the required circumference. It should be noted that both insufficient expansion and over-expansion of the expansion tabs negatively influence the desired retaining or holding value of the expansion dowel. Therefore, for anchoring of impact-driven expansion dowels provided with an expansion member retained at the front end of the expansion sleeve, special tools are used for preliminary driving the expansion member to the required circumference. However, such tools cannot be used for the expansion dowels with an expansion sleeve having an inner thread and an outwardly extending expansion member.

Accordingly, an object of the present invention is to provide an expansion dowel, in particular, an undercut self-cutting expansion dowel, having an expansion sleeve and an externally located expansion member and which can be anchored without any danger of the inner thread of the expansion sleeve, in particular, of the thread entrance, being damaged during the anchoring process.

Another object of the present invention is to provide an expansion dowel, in particular, an undercut self-cutting dowel of the above-described type, which can be anchored without use of specially formed setting tools.

A further object of the present invention is to provide an expansion dowel, in particular an undercut self-cutting dowel, of the above-described type, with which an operator can ascertain both during the setting process and thereafter whether the expansion tabs of the expansion sleeve expanded radially at a necessary circumference and whether the dowel is correctly set.

SUMMARY OF THE INVENTION

These and other objects of the present invention, which will become apparent hereinafter, are achieved by providing an expansion dowel, in particular, an undercut self-cutting expansion dowel including an expansion sleeve having a rear section provided with an inner thread, an opposite expansion section with a plurality of expansion tabs separated by axial slots, and a stepped bore. The bore has in the expansion section, a smaller inner diameter than in the rear section and a circumferential annular shoulder formed in a transitional region between the rear and the expansion sections and facing substantial toward a rear end of the expansion sleeve. An expansion member is provided at a front end of the expansion sleeve and is retained in the sleeve bore. The expansion member projects beyond the front end of the expansion sleeve and widens substantially conically in a setting direction. The expansion member has a length larger than the length of the expansion section of the expansion sleeve. The expansion tabs expand radially outwardly upon the expansion sleeve being driven over the expansion member.

With the expansion dowel according to the present invention, it is possible to effect the setting process without the use of any special tools and without any damage of the inner thread, in particular, the thread entrance. For effecting the setting, a steel member, e.g., formed of a constructional steel, is inserted in the expansion sleeve bore in the rear section of the sleeve. The diameter of the steel member should only slightly exceed the inner diameter of the sleeve bore in the expansion region of the sleeve so that the steel member can be supported against the annular shoulder formed in the sleeve bore. The expansion sleeve is driven over the expansion member, which is supported against the bottom of the bore formed in the constructional component, by axial blows applied to the steel member. The expanding expansion tabs chisel the bore wall, forming an undercut. The axial blows are applied to the rear end of the steel member. Thereby, any danger of the thread being damaged is eliminated. Any possible damage of the inner thread of the expansion sleeve in the vicinity of the annular shoulder is without consequences as, anyway, generally, the length of the inner thread is not used in its entirety.

The selected length of the expansion member permits an operator to recognize when the expansion tabs expanded to a desired circumference. Because the length of the expansion member exceeds the length of the expansion region of the expansion sleeve, in a completely expanded condition of the expansion tabs, the rear end of the expansion member projects beyond the bore section associated with the expansion region of the expansion sleeve. The operator immediately notices the end of the expansion process by rebounds of the hammer. Thereby, it is also insured that the expansion sleeve cannot be driven beyond a predetermined point. A subsequent control of a correct setting can be effected in the same manner by applying axial blows to a steel member and ascertaining of the correct setting by rebounds of the hammer. Alternatively, a control of whether the expansion member projects an adequate distance beyond the bore section associated with the expansion region of the expansion sleeve can be effected with a caliper gauge or another standardized control instrument.

In order to provide a sufficiently large support surface for the steel member, advantageously, the inner diameter of the bore in the rear section of the expansion sleeve is larger than the inner diameter of the bore in the expansion region of the expansion sleeve by from about 1.3 times to about 6 times.

In accordance with an advantageous embodiment of the present invention, the circumferential annular shoulder is formed as a conical surface, with a region of the surface which is most remote from the dowel axis, being located closer to the rear section of the expansion sleeve than the region of the surface adjacent to the dowel axis. The imaginable center of the conical surface lies in the section of the sleeve bore associated with the expansion region of the sleeve. These measures insure an automatic centering of the driven-in steel member during the setting process. The hammer blows are applied in the axial direction, and tilting of the expansion sleeve relative to the expansion member is prevented.

In accordance with the present invention, the expansion sleeve has a length which amounts to from about one time to twelve times of an inner diameter of the sleeve bore in the rear section of the expansion sleeve. A depth of a bore to be formed in a constructional component is larger than the length of the expansion sleeve and amounts to from two times to fourteen times of the inner diameter of the sleeve bore in the rear section. The length of the expansion member amounts to from about one time to five times of the difference between the necessary depth of the constructional component and the length of the expansion sleeve.

For achieving of the necessary setting force, it is advantageous when the expansion member has a bottle-like shape with at least two cone sections having different cone angles. The first cone section, which has a smaller diameter, has a larger cone angle than the adjoining it cone section which has a larger diameter. The cone angle of the cone section having a larger diameter is advantageously equal to or smaller than 5.71°. This angle insures selflocking of the expansion member in the sleeve bore. This angle was determined during a pulling-out test. A friction coefficient for steel-on-steel ($\mu$) is selected in a range between 0.1 and 0.3. The cone angle of the cone section with a smaller diameter is, as it has already been discussed above, somewhat larger. The foregoing measures permit to reduce the displacement of the expansion sleeve necessary for providing a desired depth of the undercut and to achieve favorable values of the ratio between the displacement path of the expansion sleeve and the undercut depth.

According to the present invention, a cone peg adjoins the smaller diameter cone section and provides for guiding of the expansion member in the sleeve bore. The axial length of the cone peg is smaller than the length of the smaller diameter cone section. It, of course, should be clear that the outer diameter of the cone peg is smaller than or equal to the inner diameter of the bore in the expansion region of the expansion sleeve. The cone peg does not widen the bore in the expansion region, and proper guidance is insured up to the end of the setting process.

With the cone peg having a somewhat convex, e.g., bulging outer profile, its outer diameter can slightly exceed the inner diameter of the sleeve bore in the sleeve expansion region. This insures retaining of the expansion member in the sleeve bore and serves as an additional safety measure which prevents the expansion member from falling out of the sleeve bore.

Because the expansion region has at least two bending points, which are formed as circumferential grooves, the expansion tabs fit better to the profile of the expansion member during the setting process. This reduces the necessary setting forces, provides for additional safety measure for retaining the expansion member, and improves guidance during the setting process. Advantageously, the annular grooves are provided in the outer surface of the expansion tabs. In accordance with an alternative embodiment of the invention, the annular grooves can be formed in the inner surface of the expansion tabs.

A remaining wall thickness of the expansion section in the region of the annular grooves is from about 10% to about 150% of the bore diameter in the sleeve expansion region. This thickness insures, on one hand, a radial deformation of the expansion tabs and, on the other hand, achieving of a desired holding value. A sufficient wall thickness remains to prevent fracture of the material in its weakest point.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments when read with reference to the accompanying drawings.

BRIEF DESCRIPTION OF THE DRAWINGS

In the Drawings:

FIG. 1 shows a cross-sectional view of an undercut self-cutting expansion dowel according to the present invention;

FIG. 2 shows a cross-sectional view of the expansion dowel shown in FIG. 1 in an anchored condition.

DETAILED DESCRIPTION OF THE PREFERRED EMBODIMENTS

Figure 3:
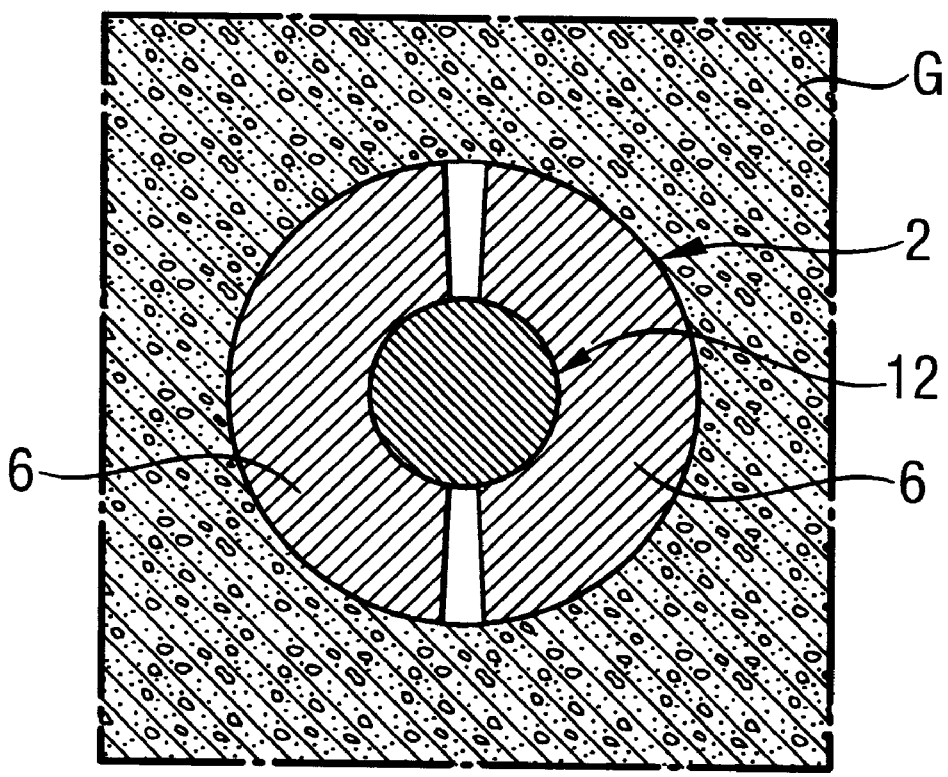
FIG. 3 shows a cross sectional view of the expansion dowel of FIG. 2 along line 3—3.

An undercut self-cutting expansion dowel according to the present invention, an initial condition of which is shown in FIG. 1 and an anchored condition which is shown in FIG. 2, is generally designated with a reference numeral 1. The inventive expansion dowel 1 includes an expansion sleeve 2 having a rear section 3 and an expansion section 5. The expansion sleeve 5 has a substantially cylindrical stepped bore 9 which, in the rear section 3 of the expansion sleeve 2, has an inner diameter r. The smaller diameter bore section 10 of the bore 9, which extends through the expansion section 5 of the expansion sleeve 2, has an inner diameter s. The inner diameter r of the bore 9, in the rear section 3 of the expansion sleeve 2, is greater than the inner diameter s of the bore section 10 in the expansion section 5 of the expansion sleeve from about 1.3 to about 6 times. In the transition area from the bore section 9 to the bore section 10, the expansion sleeve 2 has an annular surface or should (11) which is oriented substantially toward the rear end of the expansion sleeve 2. The annular surface 11 can have as, e.g., is shown in the FIG. 1, a conical shape and is inclined toward the bore section 10. During the setting process, the annular surface 11 functions as a bearing surface for a steel member 20, e.g., for a member formed of a reinforced steel.

The rear section 3 of the expansion sleeve 2 has an inner thread 4 which provides for connection with a standard bolt or a threaded rod having a standardized thread.

The expansion section 5 of the expansion sleeve 2 has a plurality of expansion tabs 6 separated by axial slots 6a from each other, as shown in FIG. 3. At their free front ends, the expansion tabs 6 are provided with cutters 7 which can include, e.g., cutting inserts formed of a hard metal. The cutters 7 can be formed by a particular shaping of the expansion tabs 6 or by subsequent hardening. The expansion sleeve 2 has a length h measured from the rear end of the expansion sleeve 2 till the cutters 7. The length h of the expansion sleeve 2 amounts to from about one time to twelve times of the inner diameter r of the bore 9 in the rear section 3 of the expansion sleeve 2. The outer surfaces of the expansion tabs 6 are provided with annular grooves 8. The annular grooves 8 serve, during the radial expansion of the expansion tabs 6, as predetermined bending points. In the region of the annular grooves 8, the expansion tabs 6 have a remaining wall thickness which amounts to from about 10% to about 150% of the bore diameter in the expansion region.

A substantially bottle-shaped expansion member 12 is held, in the pre-setting condition of the expansion dowel, in the bore section 10 of the expansion sleeve 5. The expansion member 12 is formed of several sections of which at least two cone sections 13, 14 have different lengths a, b and cone angles which differ from each other. The first cone section 13, which has a smaller diameter, has a cone angle which is greater than a cone angle of the adjoining cone section 14 having a larger diameter.

A substantially cylindrical extension 16 adjoins the cone section 14. The smaller diameter cone section 13 is connected with a cone peg 15 the outer diameter t of which (see FIG. 2) is smaller or equal to the inner diameter s of the bore section 10. The length c (FIG. 2) of the cone peg 15 is smaller than the axial length a of the adjoining cone section 13. The cone peg 15 has a substantially cylindrical shape but can have a slightly bulged outer profile to provide for a more reliable retaining of the expansion member 12 in the bore section 10 of the expansion sleeve 2 in the pre-setting condition of the expansion dowel 1. The entire length l of the expansion member 12 is greater than the axial length k of the bore section 10. The length l of the expansion member 12 amounts to about from one to five times the difference between the required bore depth d (FIG. 2) and the length h of the expansion sleeve 2. The required bore depth d (FIG. 2) is greater than the length h of the expansion sleeve 2. The bore depth d amounts to from two to fourteen times of the inner diameter r of the bore 9 in the region of the rear section 3 of the expansion sleeve 2.

Setting of the expansion dowel 1 is effected with a steel member 20 which can be formed, e.g., as discussed above, of a reinforced steel, or with a similar member. The steel member 20 is inserted in the bore 9 in the rear section 3 of the expansion sleeve 2. When selecting a suitable steel member 20, care should be taken to insure that the outer diameter of the member 20 is greater than the inner diameter s of the bore section 10 in the expansion section 5 of the expansion sleeve 3. With the outer diameter of the member 20 being greater than the diameter s of the bore section 10, the end surface of the member 20 lies on the annular surface 11 in the transitional region of the stepped bore 9 of the expansion sleeve 2. By applying axial blows to the rear end of the member 20, the expansion sleeve 2 is driven onto the expansion member 12 which is supported on the bottom of a bore B formed in a constructional component G. The expansion tabs 6, which slides along the cone sections 13, 14 of the expansion member 12, expand radially. Upon the expansion of the expansion tabs 6, the cutters 7 cut into the wall W of the constructional component G chiseling the wall material M from the wall and forming an undercut V. The cylindrical extension 16 of the expansion member 12 digs a cavity for the removed material M. The cone peg 15 of the expansion member 12 extends further and further into the bore section 10 of the expansion sleeve 2 upon the expansion member 12 being driven into the bore section 10, and thereby prevents tilting of the expansion member 12. The bending points on the expansion tabs 6, which are formed by the annular grooves 8, provide for a best possible sliding of the expansion tabs 6 along the outer profile of the expansion member 12. Thereby, the forces, which act on the expansion tabs 6 upon their expansion, a uniformly distributed along the surfaces of the expansion tabs to a most possible extent, and local pressure peaks, which can result in a cold welding, are eliminated. The end of the setting process is reached as soon as the cone peg 15 leaves the bore section 10 and projects into the bore section of the bore 9 in the rear section 3 of the expansion sleeve 2. When the cone peg 15 projects into the bore section in the rear section 3 of the expansion sleeve 2, the rear end surface of the expansion member 12 abuts the front end section of the member 20. Further axial blows applied to the member 20 rebound, and the operator can recognize that the expansion sleeve 2 cannot be driven further, and the expansion tabs 6 have expanded to a correct circumference.

The control of the setting process can be conducted in a similar manner at a later time. If upon striking the member 10 with a hammer, the hammer rebounds, the expansion dowel is set correctly. With an alternative test method, a predetermined control instrument can be mounted on the expansion dowel. The correct depth, if sensed by a control tool, indicates a proper setting process.

Though the present invention has been shown and described with reference to formlockingly anchored undercut self-forming expansion dowel, with the undercut being formed by chiseling, such is merely illustrative of the present invention and is not to be construed as to be limited to the disclosed embodiment and/or details thereof, and the present invention includes all modifications, variations and/or alternate embodiments within the spirit and scope of the present invention as defined by the appended claims.

What is claimed is:

1. An expansion dowel, comprising an expansion sleeve having a rear section provided with an inner thread, an opposite expansion section with a plurality of expansion tabs separated by axial slots, and a stepped bore having in, the expansion section, a smaller inner diameter than in a diameter in the rear section and a circumferential annular shoulder formed in a transitional region between the rear and the expansion sections and substantially facing towards a rear end of the expansion sleeve; and an expansion member provided at a front end of the expansion sleeve and retained in the sleeve bore, the expansion member projecting beyond the front end of the expansion sleeve and widening substantially conically in a setting direction, the expansion tabs expanding radially outwardly upon the expansion sleeve being driven over the expansion member, and the expansion member having a length larger than a length of the expansion section of the expansion sleeve, wherein the expansion sleeve has a length of about one to twelve times of an inner diameter of the sleeve bore in the rear section of the expansion sleeve, wherein a depth of a bore in a constructional component is larger than the length of the expansion sleeve and is two to fourteen times of the inner diameter of the sleeve bore in the rear section, and wherein the length of the expansion member is about one to five times the difference between the necessary depth in the constructional component and the length of the expansion sleeve.

2. An expansion dowel according to claim 1, wherein the expansion dowel has a bottle-like shape with at least two cone sections having different cone angles, with one cone section of the cone sections having a smaller diameter having a large cone angle than an adjoining one cone section of the cone sections.

3. An expansion dowel according to claim 2, wherein the one cone section having a smaller diameter is connected with a cone peg having an axial length smaller than a length of the one cone section having a smaller diameter, the cone peg having an outer diameter which is one of smaller than and equal to the inner diameter of the bore in the expansion of the expansion sleeve.

4. An expansion dowel according to claim 3, wherein the cone peg has a convex outer profile.

5. An expansion dowel according to claim 4, wherein the cone peg has a bulging profile.

6. An expansion dowel according to claim 2, wherein the expansion section has at least two bending points formed as circumferential grooves.

7. An expansion dowel according to claim 6, wherein the expansion section of the expansion sleeve has, in a region of the circumferential grooves, a remaining wall thickness of about 10% to 150% of the bore diameter in an expansion region of the expansion sleeve.

8. An expansion dowel according to claim 6, wherein the circumferential grooves are provided in an outer circumferential surface of the expansion section of the expansion sleeve.

* * * * *